(12) United States Patent
Fujiwara (10) Patent No.: US 9,134,748 B2
(45) Date of Patent: Sep. 15, 2015

(54) PEDAL ACTUATION DETECTOR

(75) Inventor: Noboru Fujiwara, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 14/236,398

(22) PCT Filed: Jun. 22, 2012

(86) PCT No.: PCT/JP2012/066072
§ 371 (c)(1),
(2), (4) Date: Jan. 31, 2014

(87) PCT Pub. No.: WO2013/018463
PCT Pub. Date: Feb. 7, 2013

(65) Prior Publication Data
US 2014/0150599 A1 Jun. 5, 2014

(30) Foreign Application Priority Data
Aug. 3, 2011 (JP) ................................. 2011-170557

(51) Int. Cl.
*G05G 1/30* (2008.04)
*G01L 5/28* (2006.01)
(Continued)

(52) U.S. Cl.
CPC . *G05G 1/38* (2013.01); *B60T 7/042* (2013.01); *Y10T 74/20528* (2015.01)

(58) Field of Classification Search
CPC .............. G05G 1/30; G05G 1/38; B60T 7/042
USPC .............. 74/512–514, 560; 73/132, 774, 855, 73/862.621, 862.625; 200/61.89, 86.5
See application file for complete search history.

(56) References Cited

U.S. PATENT DOCUMENTS 7,134,327 B2 * 11/2006 Saito et al. ...................... 73/132
7,228,758 B2 * 6/2007 Fujiwara ........................ 74/512
(Continued)

FOREIGN PATENT DOCUMENTS

| JP | 2001-18768 | 1/2001 |
| JP | 2001-334919 | 12/2001 |
| JP | 2005-132216 | 5/2005 |

OTHER PUBLICATIONS

Notification for Reasons for Rejection for Japanese Appl. No. 2011-170557 dated Jan. 21, 2014.
(Continued)

*Primary Examiner* — Thomas R. Hannon
*Assistant Examiner* — Adam D Rogers
(74) *Attorney, Agent, or Firm* — Finnegan, Henderson, Farabow, Garrett & Dunner, LLP (57) ABSTRACT

A pedal operation amount detection apparatus comprises: a transmitting member; a pivot lever provided on the transmitting member; and a deformable body, the pedal operation amount detection apparatus electrically detecting a pedal operation amount based on a deformation of the deformable body, the deformable body is fixed to the transmitting member, a sensor rod is fixedly fitted to the deformable body so as to extend upright relative to the deformable body, an elastic member is provided across the sensor rod and the pivot lever so as to be connected to each other, so that the pedal operating force or a reaction force corresponding to the pedal operating force is transmitted from the pivot lever to the sensor rod via the elastic member, and the sensor rod is passed, with a play, through the pivot lever so that the play allows the pivot lever to pivot.

8 Claims, 5 Drawing Sheets

(51) Int. Cl.
*G05G 1/38* (2008.04)
*B60T 7/04* (2006.01)

(56) References Cited

U.S. PATENT DOCUMENTS

| 8,763,477 B2 * | 7/2014 | Isono .................. 73/862.636 |
| 2006/0162434 A1 | 7/2006 | Saito et al. |
| 2014/0311277 A1 * | 10/2014 | Fujiwara .................. 74/512 |

OTHER PUBLICATIONS

Office Action of Chinese Application No. 201280038468.9 dated Aug. 28, 2014.
Office Action for Chinese Appl. No. 201280038468.9 dated Apr. 22, 2015.

* cited by examiner

PEDAL ACTUATION DETECTOR

CROSS-REFERENCE TO RELATED APPLICATIONS

This application is a national phase application of International Application No. PCT/JP2012/066072, filed Jun. 22, 2012, and claims the priority of Japanese Application No. 2011-170557, filed Aug. 3, 2011, the content of both of which is incorporated herein by reference.

TECHNICAL FIELD

The invention relates generally to a pedal operation amount detection apparatus, and more specifically to a pedal operation amount detection apparatus that is easily configured at low cost while ensuring a prescribed detection accuracy.

BACKGROUND ART

There has been known a pedal operation amount detection apparatus that includes: (a) a transmitting member that transmits a pedal operating force; (b) a pivot lever provided on the transmitting member so as to be pivotable relative to the transmitting member; and (c) a deformable body that is interposed between the transmitting member and the pivot lever, and that deforms based on the pedal operating force, (d) the pedal operation amount detection apparatus electrically detecting a pedal operation amount based on a deformation of the deformable body. An apparatus described in Patent Document 1 is an example of the above-described apparatus, and is configured such that a reaction force is transmitted from a pivot lever to a deformable body via an elastic member (compression coil spring) held between a pair of spring retainers, and the spring retainers, the elastic member, and the deformable body are accommodated in a case so as to be provided on a transmitting member (operating pedal). Patent Document 2 proposes a technique in which a pivot lever itself, which is connected to an output member (push rod), is used as a deformable body, and a deformation (distortion) of the pivot lever is detected electrically.

RELATED ART DOCUMENT

Patent Document

Patent Document 1: Japanese Patent Application Publication No. 2001-018768
Patent Document 2: Japanese Patent Application Publication No. 2001-334919

SUMMARY OF THE INVENTION

Problem to be Solved by the Invention

However, because the apparatus described in Patent Document 1 has a complicated structure and the number of its components is large, there is a problem that the manufacturing cost is high. The apparatus described in Patent Document 2 requires a decreased number of components, and thus the manufacturing cost is reduced. However, because the apparatus detects a deformation of the pivot lever itself, which is connected to the output member, there is a possibility that detection accuracy will be reduced under the influence of disturbances such as engine vibrations.

The invention is made in the light of the above-described circumstances, and an object of the invention is to make it possible to easily configure, at low cost, a pedal operation amount detection apparatus that detects a pedal operation amount based on the deformation of a deformable body, while ensuring a prescribed detection accuracy.

Means for Solving the Problem

To achieve the object, the first aspect of the invention provides a pedal operation amount detection apparatus comprising: (a) a transmitting member that transmits a pedal operating force; (b) a pivot lever provided on the transmitting member so as to be pivotable relative to the transmitting member; and (c) a deformable body that is interposed between the transmitting member and the pivot lever, and that deforms based on the pedal operating force, (d) the pedal operation amount detection apparatus electrically detecting a pedal operation amount based on a deformation of the deformable body, characterized in that (e) the deformable body is fixed to the transmitting member, a sensor rod is fixedly fitted to the deformable body so as to extend upright relative to the deformable body, an elastic member is provided across the sensor rod and the pivot lever so as to be connected to each other, so that the pedal operating force or a reaction force corresponding to the pedal operating force is transmitted from the pivot lever to the sensor rod via the elastic member, and (f) the sensor rod is passed, with a play, through the pivot lever so that the play allows the pivot lever to pivot.

The second aspect of the invention provides a pedal operation amount detection apparatus comprising: (a) a transmitting member that is provided so as to be pivotable about a support axis, and that transmits a pedal operating force; (b) a pivot lever provided on the transmitting member so as to be pivotable about a pivot axis that is parallel to the support axis; (c) an output member to which the pedal operating force is transmitted from the transmitting member via the pivot lever, and which applies a reaction force corresponding to the pedal operating force, to the pivot lever; and (d) a deformable body that is interposed between the transmitting member and the pivot lever, and that deforms based on the reaction force, (e) the pedal operation amount detection apparatus electrically detecting a pedal operation amount based on a deformation of the deformable body, characterized in that (f) the deformable body is fixed to the transmitting member, a sensor rod is fixedly fitted to the deformable body so as to extend upright relative to the deformable body, an elastic member is provided across the sensor rod and the pivot lever so as to be connected to each other, so that the reaction force is transmitted from the pivot lever to the sensor rod via the elastic member, and (g) the sensor rod is passed, with a play, through the pivot lever so that the play allows the pivot lever to pivot.

The third aspect of the invention provides the pedal operation amount detection apparatus recited in the second aspect of the invention, characterized by having a pedal stroke region including: (a) an elasticity transmission region in which, in a case where the transmitting member is pivoted about the support axis based on the pedal operating force, the pivot lever pivots relative to the transmitting member while elastically deforming the elastic member based on the reaction force, so that the reaction force is transmitted from the pivot lever to the sensor rod; and (b) a transmission restricted region in which, when a pivot amount of the transmitting member exceeds a prescribed stopper stroke, the pivot lever comes into contact with a stopper provided in the transmitting member to prevent the pivot lever from further pivoting, so that the reaction force that is transmitted from the pivot lever to the sensor rod is maintained constant.

The fourth aspect of the invention provides the pedal operation amount detection apparatus recited in the third aspect of the invention, characterized in that: (a) the output member is connected to the pivot lever via a connecting pin that is parallel to the pivot axis; (b) the pivot lever is provided with a collar, and the connecting pin is passed through an inside of the collar; (c) the transmitting member has a stopper hole which serves as the stopper and through which the collar is passed with a prescribed play formed around the pivot axis, the play allows the pivot lever to pivot, and when the pivot amount of the transmitting member reaches the prescribed stopper stroke, the collar comes into contact with an inner wall face of the stopper hole to prevent the pivot lever from further pivoting.

The fifth aspect of the invention provides the pedal operation amount detection apparatus recited in any one of the first to fourth aspects of the invention, characterized in that: the deformable body is an elongate plate deformable in a flexure manner; both longitudinal end portions of the elongate plate are fixed to the transmitting member; and the sensor rod is arranged at a longitudinal center portion of the elongate plate so as to extend perpendicularly to the elongate plate.

The sixth aspect of the invention provides the pedal operation amount detection apparatus recited in any one of the first to fifth aspects of the invention, characterized in that: the pivot lever has a through-hole; and the sensor rod is passed, with a play, through the through-hole.

The seventh aspect of the invention provides the pedal operation amount detection apparatus recited in the sixth aspect of the invention, characterized in that the elastic member is a compression coil spring, provided so as to be concentric with the sensor rod, and interposed between the sensor rod and the pivot lever.

The eighth aspect of the invention provides the pedal operation amount detection apparatus recited in the sixth aspect of the invention, characterized in that the elastic member is a tensile coil spring, provided parallel to the sensor rod, provided across the sensor rod and the pivot lever, and hooked on the sensor rod and the pivot lever.

Effects of the Invention

In the pedal operation amount detection apparatus recited in the first aspect of the invention, the sensor rod is fixedly fitted to the deformable body so as to extend upright relative to the deformable body fixed to the transmitting member, and the elastic member is provided across the sensor rod and the pivot lever so as to be connected to each other. Therefore, the pedal operation amount detection apparatus is easily configured at low cost. Further, the pedal operating force or the reaction force is transmitted from the pivot lever to the sensor rod via the elastic member. This makes it possible to restrict inputs of disturbances such as engine vibrations to ensure a prescribed detection accuracy even a case where the output member is connected to the pivot lever to transmit the reaction force, in comparison with a case where a pedal operation amount is detected based on the deformation of the pivot lever. Note that, in a case where an input member is connected to the pivot lever to transmit the pedal operating force, it is unlikely that the detection accuracy will decrease due to disturbances such as engine vibrations.

The second aspect of the invention substantially corresponds to an embodiment of the first aspect of the invention, and obtains the same advantageous effects as those in the first aspect of the invention. That is, the sensor rod is fixedly fitted to the deformable body so as to extend upright relative to the deformable body fixed to the transmitting member, and the elastic member is provided across the sensor rod and the pivot lever so as to be connected to each other. Therefore, the pedal operation amount detection apparatus is easily configured at low cost, and the reaction force is transmitted from the pivot lever to the sensor rod via the elastic member. This makes it possible to restrict inputs of disturbances such as engine vibrations to ensure a prescribed detection accuracy, in comparison with a case where a pedal operation amount is detected based on the deformation of the pivot lever.

The third aspect of the invention includes a pedal stroke region including the elasticity transmission region and the transmission restricted region, and in the elasticity transmission region, the pivot lever pivots to elastically deform the elastic member and to transmit the reaction force to the sensor rod, so that the deformable body is deformed appropriately based on a pedal stroke, thus making it possible to detect a pedal operation amount. On the other hand, in the transmission restricted region, the pivot lever is prevented from pivoting so that the reaction force that is transmitted to the sensor rod is maintained constant. Therefore, it is possible to prevent an excessive reaction force from acting on the deformable body, thus making it possible to reduce the size and thickness of the deformable body.

In the fourth aspect of the invention, when the collar provided in the pivot lever comes into contact with the inner wall face of the stopper hole, the stopper stroke is restricted and the pivot lever is prevented from further pivoting. Therefore, variations of the stopper stroke are determined only by two factors, that is, an outside diameter of the collar and an inside diameter of the stopper hole. This makes it possible to control the stopper stroke with a high degree of accuracy. In the meantime, because the connecting pin that connects the pivot lever to the output member is passed through the collar, it is possible to easily configure the apparatus at low cost.

In the fifth aspect of the invention, the deformable body is an elongate plate deformable in a flexure manner, the both longitudinal ends of the elongate plate are fixed to the transmitting member, and the sensor rod is provided at the longitudinal center portion thereof so as to extend perpendicularly to the elongate plate. Therefore, it is possible to easily configure the apparatus at low cost and to detect a pedal operation amount by appropriately deforming the deformable body in a flexure manner by the sensor rod.

In the sixth aspect of the invention, the sensor rod is passed, with a play, through the through-hole formed in the pivot lever. Therefore, it is possible to realize a compact configuration by disposing the pivot lever and the sensor rod on a common plane, and it is possible to suppress, for example, occurrence of an inappropriate positional relationship between the pivot lever and the sensor rod and to appropriately transmit the reaction force from the pivot lever to the sensor rod.

The seventh aspect of the invention is the case where the compression coil spring is used as an elastic member, and the compression coil spring is provided so as to be concentric with the sensor rod and interposed between the sensor rod and the pivot lever. Therefore, the apparatus is easily configured at low cost. Further, the reaction force is appropriately transmitted from the pivot lever to the sensor rod via the compression coil spring. This makes it possible to suppress, for example, occurrence of an inappropriate positional relationship between the pivot lever and the sensor rod, thereby stably achieving a high degree of accuracy.

The eighth aspect of the invention is the case where the tensile coil spring is used as an elastic member, provided parallel to the sensor rod, provided across the sensor rod and the pivot lever, and hooked on the sensor rod and the pivot lever. Therefore, the apparatus is easily configured at low cost. Further, the reaction force is appropriately transmitted from the pivot lever to the sensor rod via the tensile coil spring. This makes it possible to suppress, for example, occurrence of an inappropriate positional relationship between the pivot lever and the sensor rod, thereby stably achieving a high degree of accuracy.

BRIEF DESCRIPTION OF THE DRAWINGS

FIG. 1 is a view for explaining an example of an operating pedal apparatus for a vehicle service brake, the operating pedal apparatus being provided with a pedal operation amount detection apparatus according to an embodiment of the invention.

FIG. 2 is a view illustrating a state where an operating pedal of FIG. 1 has been depressed.

FIG. 3 is a graph illustrating the relationship in the operating pedal apparatus of FIG. 1 between a value detected by strain sensors and the pedal stroke.

MODES FOR CARRYING OUT THE INVENTION

The pedal operation amount detection apparatus according to the invention is suitable for use as an apparatus that detects a pedal operation amount of a vehicle operating pedal such as a brake pedal or an accelerator pedal, namely, a pedal operating force or a pedal stroke (depressing stroke), but is also applicable to a pedal operation amount detection apparatus for an operating pedal other than a vehicle operating pedal. The vehicle operating pedal may be configured to mechanically operate a wheel brake or the like in response to an operation of the operating pedal, or may be an electric (by-wire) operating pedal apparatus that electrically controls a wheel brake, a vehicle driving device, or the like based on a pedal operation amount electrically detected.

The transmitting member may be a foot-operated operating pedal itself. However, in a case where a pedal operating force is transmitted via an intermediate lever or a connecting link, the intermediate lever or the connecting link may be used as the transmitting member. The output member is a member which is pivotably connected to the operating pedal or the intermediate lever, and to which a pedal operating force is transmitted and a reaction force is applied. The output member is, for example, an operating rod of a brake booster or a push rod of a brake master cylinder, to which a brake reaction force is applied directly. The connecting link connected to the operating pedal, the intermediate lever connected to the connecting link, or the like may be used as the output member. In a case where a by-wire operating pedal apparatus is used, a reaction force should be applied to the output member by a reaction force mechanism such as a spring.

The deformable body is deformed based on a pedal operating force or a reaction force, and is made of metal or another material that is elastically deformable, such as a spring plate. A strain sensor such as a strain gauge is used to electrically detect a deformation (distortion) of the deformable body. Based on a value detected by the strain sensor, a pedal operation amount such as a pedal operating force or a pedal stroke is obtained according to a predetermined conversion formula or map, for example.

As the elastic member provided between the pivot lever and the sensor rod, a compression coil spring or a tensile coil spring is suitably used. However, other spring members such as a disc spring or a torsion coil spring may be used, or other elastic bodies such as a rubber member may be employed. By appropriately setting a lever ratio of the pivot lever, that is, a ratio between a moment arm from the pivot axis to a connection position of the output member and a moment arm from the pivot axis to a connection position of the elastic member, it is possible to adjust a load that is transmitted to the deformable body.

In the third aspect of the invention, an elasticity transmission region and a transmission restricted region are set. However, only the elasticity transmission region may be set without providing a stopper. The elastic member may be provided in a state where the elastic member is elastically deformed in advance, so as to set a direct transmission region in which a reaction force is directly transmitted from the pivot lever to the deformable body via the sensor rod without causing elastic deformation of the elastic member until the reaction force (pedal operating force) reaches a prescribed magnitude. In a case where the elastic member is in a substantially natural state in an initial state, the elastic member is elastically deformed from the beginning of a pedal depressing operation, so that the pedal stroke reaches the elasticity transmission region immediately without passing through the direct transmission region.

In the fourth aspect of the invention, the pivot lever is provided with a collar, and a stopper stroke is limited when the collar comes into contact with an inner wall face of a stopper hole. However, a connecting pin that connects the output member to the pivot lever may directly come into contact with the inner wall face of the stopper hole, or the transmitting member may be provided with a stopper that limits a pivot range of the pivot lever, separately from the collar and the connecting pin. Thus, it is possible to implement the invention in various modes.

The third aspect of the invention and the fourth aspect of the invention depend from the second aspect of the invention in which the reaction force is transmitted to the pivot lever from the output member. However, even in a case where the pedal operating force is transmitted to the pivot lever from a predetermined input member in the implementation of the first aspect of the invention, the configuration similar to that of the third aspect of the invention or the fourth aspect of the invention may be employed. For example, there may be employed a configuration having (a) an elasticity transmission region in which, in a case where the transmitting member is pivoted about the support axis based on the pedal operating force, the pivot lever pivots relative to the transmitting member while elastically deforming the elastic member based on the pedal operating force, so that the pedal operating force is transmitted from the pivot lever to the sensor rod, and (b) a transmission restricted region in which, when a pivot amount of the transmitting member exceeds a prescribed stopper stroke, the pivot lever comes into contact with a stopper provided in the transmitting member to prevent the pivot lever from further pivoting, so that the pedal operating force that is transmitted from the pivot lever to the sensor rod is maintained constant. Further, there may be employed a configuration where (a) the input member is connected to the pivot lever via a connecting pin that is parallel to the pivot axis, (b) the pivot lever is provided with a collar, and the connecting pin is passed through the inside of the collar, and (c) the transmitting member has a stopper hole which serves as the stopper and through which the collar is passed with a prescribed play formed around the pivot axis, so that the pivot lever is allowed to pivot due to the play, and when the stopper stroke is reached, the collar comes into contact with an inner wall face of the stopper hole so as to prevent the pivot lever from further pivoting.

In the fifth aspect of the invention, both longitudinal end portions of the deformable body formed of an elongate plate are fixed to the transmitting member, and the sensor rod is provided at a longitudinal center portion thereof so as to extend perpendicularly to the deformable body. However, the deformable body may be fixed to the transmitting member in a cantilever manner and the sensor rod may be provided on a free-end side so as to extend upright relative to the deformable body, or the sensor rod may be fixed to the deformable body in such a posture that the sensor rod is tilted relative to the deformable body. Thus, it is possible to implement the invention in various modes.

In the sixth aspect of the invention, the sensor rod is passed, with a play, through a through-hole formed in the pivot lever. However, the distal end of the pivot lever may be provided with a cutout having a slit shape.

Embodiment 1

Hereinafter, embodiments of the invention will be described in detail with reference to the attached drawings.

Figures 1A, 1B:
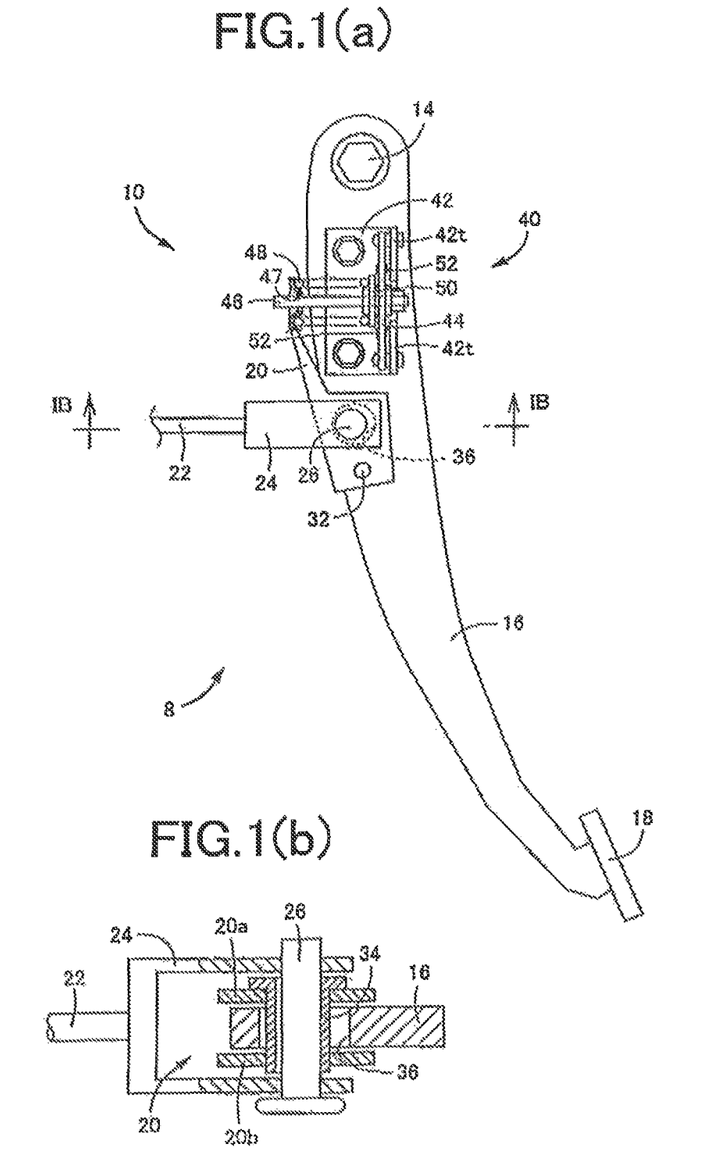
FIG. 1(a) is a front view.
FIG. 1(b) is an enlarged sectional view taken along the line IB-IB in FIG. 1(a).
Figures 2A, 2B:
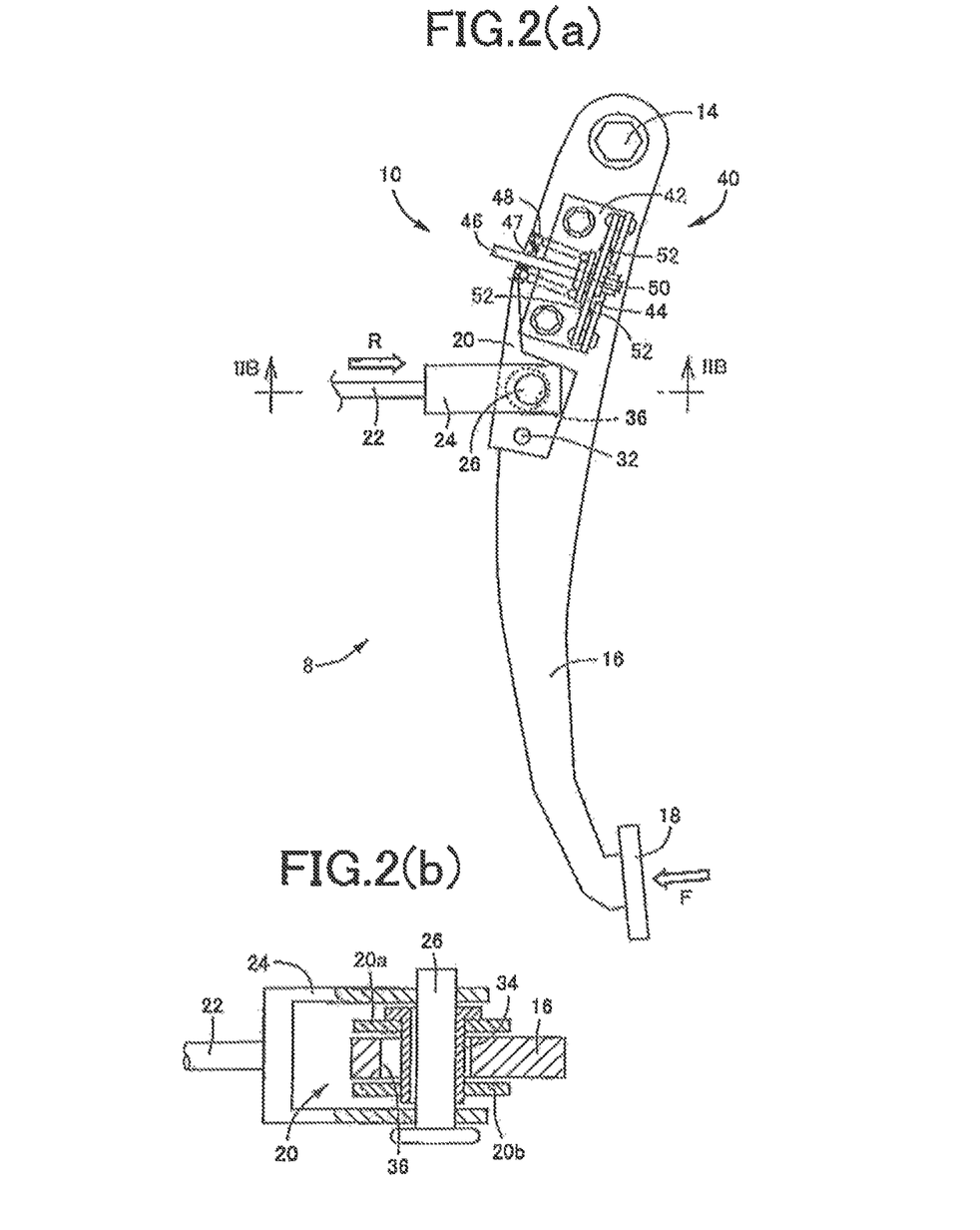
FIG. 2(a) is a front view.
FIG. 2(b) is an enlarged sectional view taken along the line IIB-IIB in FIG. 2(a).

FIG. 1 is a view illustrating an operating pedal apparatus 8 for a vehicle service brake, the operating pedal apparatus 8 being provided with a pedal operation amount detection apparatus 10 according to an embodiment of the invention. FIG. 1(a) is a front view (view as viewed from the left side of a vehicle in a state where the operating pedal apparatus 8 is mounted in the vehicle). FIG. 1(b) is an enlarged sectional view taken along the line IB-IB in FIG. 1(a). FIG. 2 is a view illustrating a state where an operating pedal 16 of the operating pedal apparatus 8 has been depressed. FIG. 2(a) is a front view. FIG. 2(b) is an enlarged sectional view taken along the line IIB-IIB in FIG. 2(a). The operating pedal apparatus 8 includes the operating pedal 16 provided so as to be pivotable about an axis of a support shaft 14 that is mounted substantially horizontally on a pedal support (not shown). The axis of the support shaft 14 corresponds to a support axis. The operating pedal 16 is depressed by a foot of a driver according to a braking request. A depressing portion (pad) 18 is provided at a lower end portion of the operating pedal 16, and an operating rod 22 of a brake booster is connected to an intermediate portion of the operating pedal 16 via a pivot lever 20. The operating pedal 16 corresponds to an input member having the depressing portion 18 to which a pedal operating force F is applied, and also corresponds to a transmitting member that transmits the pedal operating force F toward the operating rod 22. The operating rod 22 corresponds to an output member to which the pedal operating force F is transmitted from the operating pedal 16 via the pivot lever 20 and to which a brake reaction force R corresponding to the pedal operating force F is applied by the brake booster. Note that in a case where a by-wire operating pedal apparatus that electrically controls a wheel brake is employed, a reaction force member to which a prescribed reaction force is applied by a reaction force mechanism or the like is connected instead of the operating rod 22.

The pivot lever 20 is provided on the operating pedal 16 so as to be pivotable about an axis of a support pin 32 that is parallel to the support shaft 14. The pivot lever 20 extends upward along the operating pedal 16, and has a pair of side plate portions 20a, 20b arranged parallel to each other on respective sides of the operating pedal 16. A cylindrical collar 34 is provided parallel to the support pin 32 so as to extend across the side plate portions 20a, 20b. The operating pedal 16 has a circular stopper hole 36 through which the collar 34 is passed with a prescribed play. The play allows the pivot lever 20 to pivot, and a pivot range is limited when the collar 34 comes into contact with an inner wall face of the stopper hole 36. The axis of the support pin 32 corresponds to a pivot axis of the pivot lever 20, and the stopper hole 36 functions as a stopper that restricts pivot of the pivot lever 20 relative to the operating pedal 16.

A bifurcated (U-shaped) clevis 24 is fixedly fitted to the end portion of the operating rod 22 by screw coupling, or the like, and a columnar clevis pin 26 that has a circular section is arranged so as to extend parallel to the support pin 32. When the clevis pin 26 is passed through the collar 34 so as to be rotatable relative to the collar 34, the operating rod 22 is connected to the pivot lever 20 so as to be rotatable relative to the pivot lever 20. Therefore, when the operating pedal 16 is depressed as illustrated in FIG. 2, a force for pivoting the pivot lever 20 clockwise about the support pin 32 based on the brake reaction force R is applied to the pivot lever 20 from the operating rod 22. The collar 34 is fixedly fitted to, for example, the pair of side plate portions 20a, 20b of the pivot lever 20. The clevis pin 26 corresponds to a connecting pin.

The operating rod 22 is connected to a base end portion of the pivot lever 20 that extends upward along the operating pedal 16, namely, a portion near the support pin 32, and the distal end of the pivot lever 20 is connected to the operating pedal 16 via a load detection portion 40. The pedal operation amount detection apparatus 10 is configured to include the pivot lever 20 and the load detection portion 40. The load detection portion 40 includes a deformable body 44 attached to the operating pedal 16 via a bracket 42, a sensor rod 46 fixedly fitted to the deformable body 44 so as to extend upright relative to the deformable body 44, and a compression coil spring 48 interposed between the sensor rod 46 and the pivot lever 20. The compression coil spring 48 corresponds to an elastic member.

The deformable body 44 is formed of an elongate plate such as a spring plate that is deformable in a flexure manner. Both longitudinal end portions (upper and lower end portions) of the deformable body 44 are fixedly fitted to the bracket 42 with rivets or the like, in such a posture that its longitudinal direction coincides with the up-down direction, that is, the direction substantially perpendicular to the direction in which the operating pedal 16 pivots, and the deformable body 44 is substantially perpendicular to a plane on which the operating pedal 16 pivots (perpendicular to a sheet on which FIG. 1 is drawn). The bracket 42 is provided with a pair of longitudinal wall portions 42t bent substantially at right angles, and the deformable body 44 is fixed to the longitudinal wall portions 42t. The sensor rod 46 is fixedly fitted, by screw fastening or the like, to a longitudinal center of the deformable body 44, in such a posture that the sensor rod 46 is substantially perpendicular to a plate surface of the deformable body 44. Thus, in an initial state illustrated in FIG. 1 in which the operating pedal 16 has not been depressed, the sensor rod 46 is maintained in such a posture as to be substantially parallel to the operating rod 22.

A through-hole 47 is formed in the distal end of the pivot lever 20, and the sensor rod 46 is passed, with a play, through the through-hole 47 so that the play allows the pivot lever 20 to pivot as is apparent from FIG. 1(a) and FIG. 2(a). Further, the compression coil spring 48 is provided so as to be concentric with the sensor rod 46, that is, the sensor rod 46 is provided so as to be passed through the inside of the compression coil spring 48, so that the compression coil spring 48 is interposed between a spring receiver 50 provided at the sensor rod 46 and the distal end portion of the pivot lever 20.

Therefore, when the operating pedal 16 pivots clockwise about the support shaft 14 as illustrated in FIG. 2 based on the pedal operating force F, and the brake reaction force R corresponding to the pedal operating force F is applied from the operating rod 22 to the pivot lever 20 via the clevis pin 26 and the collar 34, the pivot lever 20 pivots relative to the operating pedal 16 while elastically deforming (compressively deforming) the compression coil spring 48 based on the brake reaction force R. Thus, the brake reaction force R is transmitted from the pivot lever 20 to the deformable body 44 via the compression coil spring 48 and the sensor rod 46, so that the deformable body 44 is deformed in a flexure manner based on the brake reaction force R. A plurality of strain sensors 52 such as strain gauges is attached to the deformable body 44 so as to form, for example, a bridge circuit, and a detection signal according to a deformation amount of the deformable body 44 is output from each strain sensor 52. The value detected by the strain sensors 52 varies depending on a pedal stroke (depressing operation amount) of the operating pedal 16. In view of this, based on the detected value, a pedal operation amount such as the pedal operating force F or the pedal stroke is obtained according to a predetermined conversion formula or map, for example.

In the meantime, when the collar 34 of the pivot lever 20 that is pivoted with an increase in the brake reaction force R comes into contact with the inner wall face of the stopper hole 36 formed in the operating pedal 16, the pivot lever 20 is prevented from further pivoting, so that the brake reaction force R that is transmitted from the pivot lever 20 to the sensor rod 46 via the compression coil spring 48 is prevented from further increasing. That is, when the pedal stroke of the operating pedal 16 exceeds a stopper stroke STs at which the collar 34 comes into contact with the stopper hole 36, the pivot lever 20 is prevented from pivoting relative to the operating pedal 16 even if the operating pedal 16 is further depressed and thus the brake reaction force R is increased. Thus, the brake reaction force R that is applied to the deformable body 44 from the pivot lever 20 via the compression coil spring 48 and the sensor rod 46 is maintained constant. As a result, excessive deformation of the deformable body 44 is prevented.

Figure 3A:
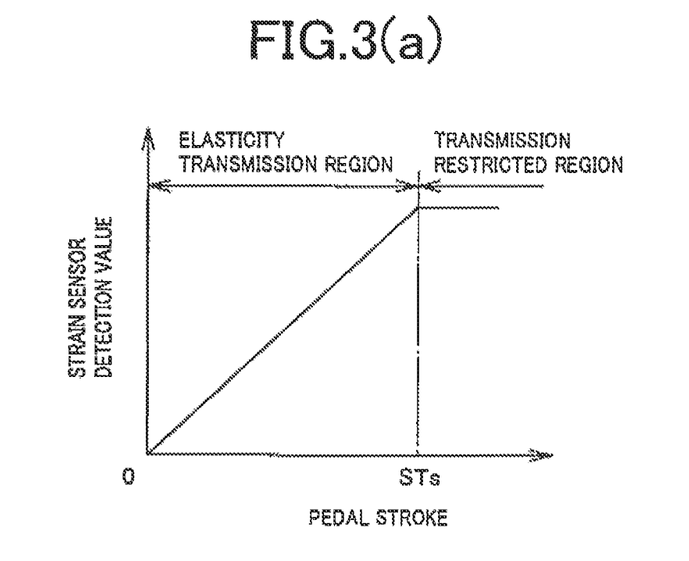
FIG. 3(a) illustrates a case where the compression coil spring is provided in a natural state.
Figure 3B:
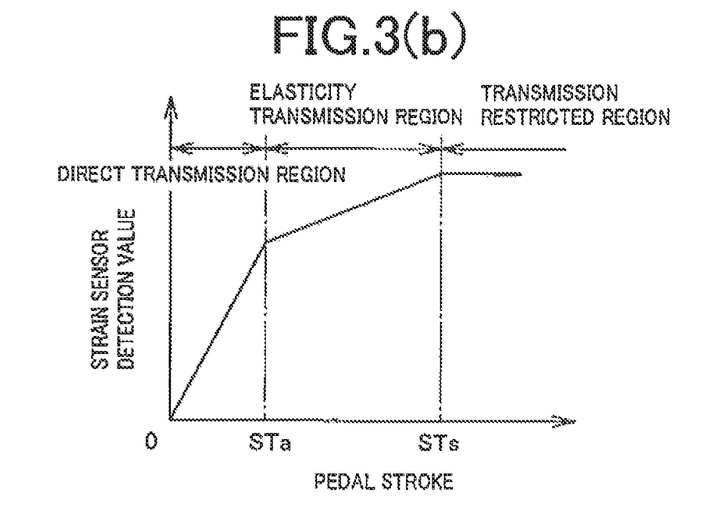
FIG. 3(b) illustrates a case where the compression coil spring is provided in a predetermined compressed state.

FIG. 3(a) and FIG. 3(b) are graphs illustrating the relationship between the value detected by the strain sensors 52 and the pedal stroke. FIG. 3(a) illustrates a case where the compression coil spring 48 is provided in a natural state in the initial state as illustrated in FIG. 1. FIG. 3(b) illustrates a case where the compression coil spring 48 is provided in a predetermined compressed state. That is, in the case where the compression coil spring 48 is provided in the natural state in the initial state, when the brake reaction force R is applied to the pivot lever 20 in response to a depressing operation of the operating pedal 16, the compression coil spring 48 immediately starts to be compressively deformed based on the brake reaction force R. Therefore, as illustrated in FIG. 3(a), the detected value increases until the pedal stroke reaches the stopper stroke STs, with a substantially constant characteristic, and when the pedal stroke of the operating pedal 16 exceeds the stopper stroke STs, the detected value is maintained constant. In this case, a pedal stroke region includes an elasticity transmission region, in this region the pedal stroke is equal to or smaller than the stopper stroke STs, in which the pivot lever 20 pivots relative to the operating pedal 16 while elastically deforming the compression coil spring 48 based on the brake reaction force R, so that the brake reaction force R is transmitted from the compression coil spring 48 to the deformable body 44 via the sensor rod 46, and a pedal stroke region also includes a transmission restricted region, in this region the pedal stroke exceeds the stopper stroke STs, in which the pivot lever 20 comes into contact with the inner wall face of the stopper hole 36 so that the pivot lever 20 is prevented from further pivoting and the brake reaction force R that is transmitted from the pivot lever 20 to the sensor rod 46 is maintained constant.

In the case where the compression coil spring 48 is provided in the predetermined compressed state in the initial state illustrated in FIG. 1, the compression coil spring 48 does not elastically deforms until the brake reaction force R reaches a prescribed magnitude. In view of this, there is a direct transmission region in which the brake reaction force R is transmitted to the sensor rod 46 directly from the pivot lever 20, prior to the elasticity transmission region. That is, an elasticity start stroke STa in FIG. 3(b) is a pedal stroke at which the brake reaction force R starts increasing along with the depressing operation of the operating pedal 16 and the compression coil spring 48 starts to be compressively deformed. A pedal stroke region, in which the pedal stroke is equal to or smaller than the elasticity start stroke STa, is the direct transmission region, and a pedal stroke region from the elasticity start stroke STa to the stopper stroke STs is the elasticity transmission region. In the elasticity transmission region, because the compression coil spring 48 is compressively deformed, the rate of increase in the detected value, in other words, increase in the brake reaction force R is reduced accordingly, in comparison with the direct transmission region. Note that in a case where the compression coil spring 48 is provided between the pivot lever 20 and the spring receiver 50 in a predetermined compressed state as described above, it is necessary to maintain the compression coil spring 48 in the compressed state, for example, by providing a stopper for the sensor rod 46.

In such a pedal operation amount detection apparatus 10, the sensor rod 46 is fixedly fitted to the deformable body 44 so as to extend upright relative to the deformable body 44 fixed to the operating pedal 16 via the bracket 42, and the sensor rod 46 and the pivot lever 20 are connected to each other via the compression coil spring 48. Therefore, the pedal operation amount detection apparatus 10 is easily configured at low cost, and the brake reaction force R is transmitted from the pivot lever 20 to the sensor rod 46 via the compression coil spring 48. This makes it possible to restrict inputs of disturbances such as engine vibrations to ensure a prescribed detection accuracy, in comparison with a case where a pedal operation amount is detected based on the deformation of the pivot lever 20.

In the present embodiment, the pivot range of the pivot lever 20 is restricted by the stopper hole 36, so that the elasticity transmission region and the transmission restricted region are set. In view of this, in the transmission region, the pivot lever 20 pivots to elastically deform the compression coil spring 48 and to transmit the brake reaction force R to the sensor rod 46, so that the deformable body 44 is deformed appropriately based on a pedal stroke, thus making it possible to detect a pedal operation amount. On the other hand, in the transmission restricted region, the pivot lever 20 is prevented from pivoting so that the brake reaction force R that is transmitted to the sensor rod 46 is maintained constant. Therefore, it is possible to prevent an excessive brake reaction force R from acting on the deformable body 44, thus making it possible to reduce the size and thickness of the deformable body 44.

Further, in the present embodiment, when the collar 34 provided in the pivot lever 20 comes into contact with the inner wall face of the stopper hole 36, the stopper stroke STs is restricted and the pivot lever 20 is prevented from further pivoting. Therefore, variations of the stopper stroke STs are determined only by two factors, that is, an outside diameter of the collar 34 and an inside diameter of the stopper hole 36. This makes it possible to control the stopper stroke STs with a high degree of accuracy. In the meantime, because the clevis pin 26 that connects the pivot lever 20 to the operating rod 22 is passed through the collar 34, it is possible to easily configure the apparatus at low cost.

Further, in the present embodiment, the deformable body 44 is an elongate plate deformable in a flexure manner, the both longitudinal ends of the elongate plate are fixed to the operating pedal 16, and the sensor rod 46 is provided at the longitudinal center portion thereof so as to extend perpendicularly to the plate surface of the deformable body 44. Therefore, it is possible to easily configure the apparatus at low cost and to detect a pedal operation amount by appropriately deforming the deformable body 44 in a flexure manner by the sensor rod 46.

Further, in the present embodiment, the sensor rod 46 is passed, with a play, through the through-hole 47 formed in the distal end portion of the pivot lever 20. Therefore, it is possible to realize a compact configuration by disposing the pivot lever 20 and the sensor rod 46 on a common plane, and it is possible to suppress, for example, occurrence of an inappropriate positional relationship between the pivot lever 20 and the sensor rod 46 and to appropriately transmit the brake reaction force R from the pivot lever 20 to the sensor rod 46.

Further, in the present embodiment, the compression coil spring 48 is used as an elastic member, and the compression coil spring 48 is provided so as to be concentric with the sensor rod 46 and interposed between the sensor rod 46 and the pivot lever 20. Therefore, the apparatus is easily configured at low cost. Further, the brake reaction force R is appropriately transmitted from the pivot lever 20 to the sensor rod 46 via the compression coil spring 48. This makes it possible to suppress, for example, occurrence of an inappropriate positional relationship between the pivot lever 20 and the sensor rod 46, thereby stably achieving a high degree of accuracy.

Embodiment 2

Next, another embodiment of the invention will be described. Note that, in the following embodiment, the same reference symbols as those in the above-described embodiment will be assigned to the portions that are substantially the same as those in the above-described embodiment, and detailed description thereof will be omitted.

Figure 4:
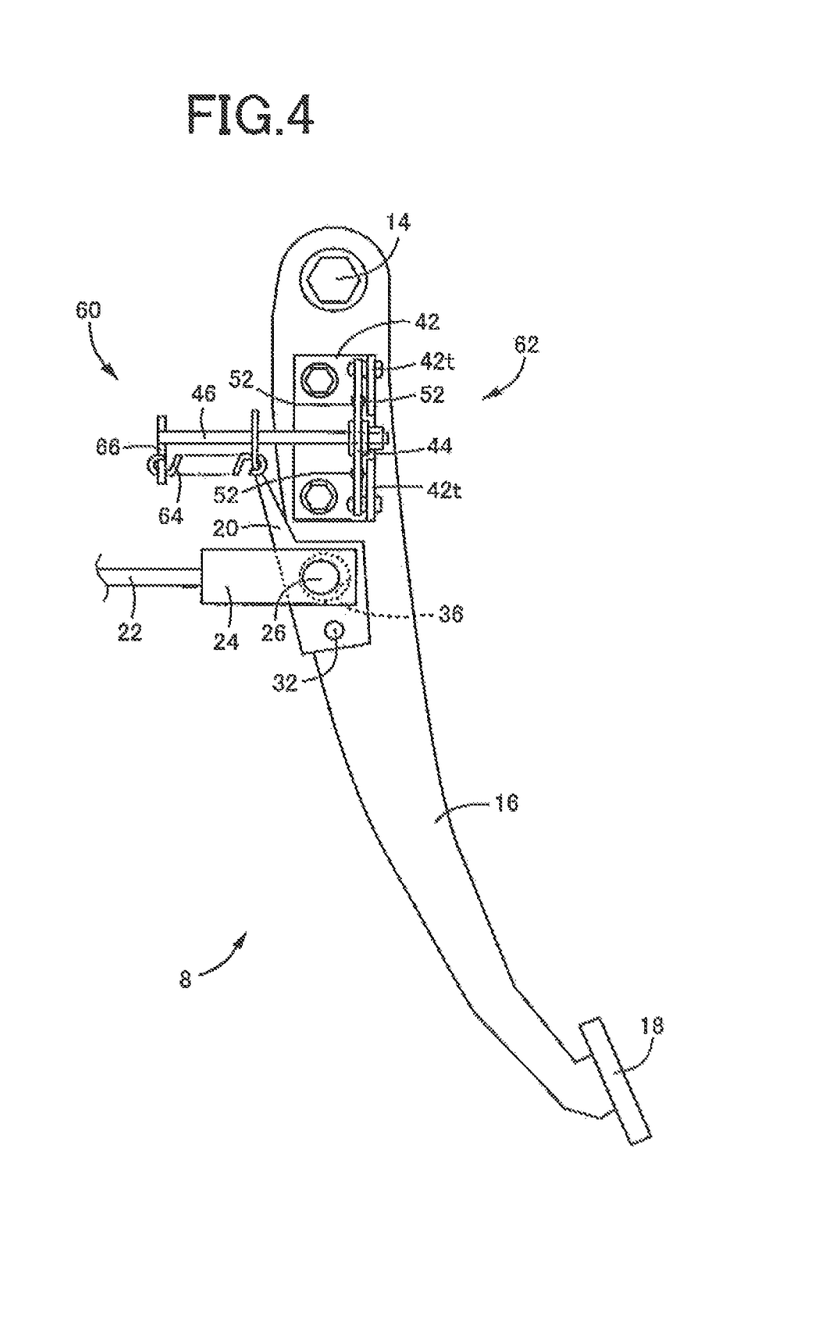
FIG. 4 is a view for explaining another embodiment of the invention, and a front view corresponding to FIG. 1(a).
Figure 5:
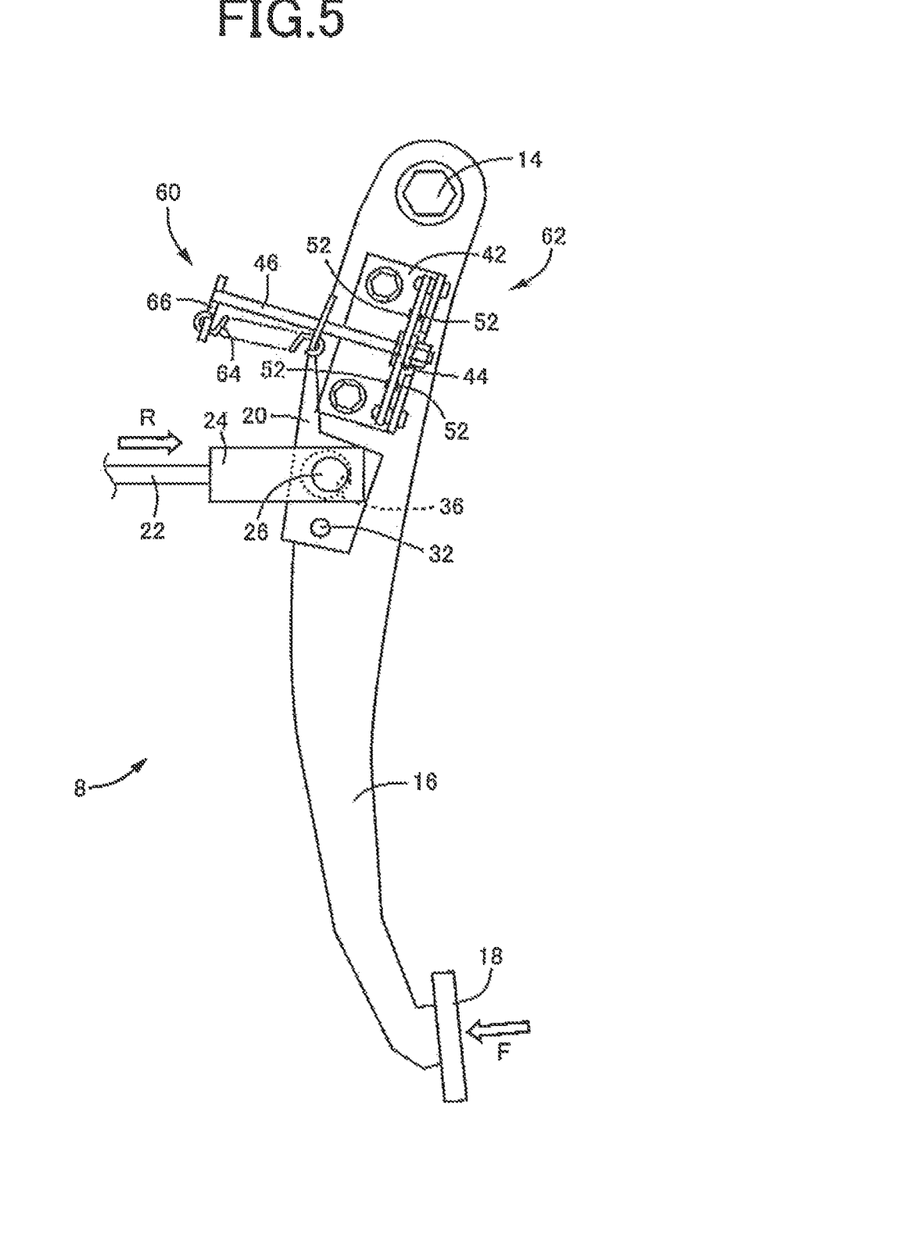
FIG. 5 is a view illustrating a state where an operating pedal of FIG. 4 has been depressed, and a front view corresponding to FIG. 2(a).

FIG. 4 and FIG. 5 are views corresponding to FIG. 1(a) and FIG. 2(a), respectively. A load detection portion 62 of a pedal operation amount detection apparatus 60 in this embodiment is different from the load detection portion 40 in the above-described embodiment in that a tensile coil spring 64 is used instead of the compression coil spring 48. That is, a sensor rod 46 is made longer than the sensor rod 46 in the above-described embodiment, a spring hooked member 66 is provided at the distal end thereof, and the tensile coil spring 64 provided parallel to the sensor rod 46 is provided across the spring hooked member 66 and the pivot lever 20 and hooked thereon. Therefore, when the brake reaction force R is applied to the pivot lever 20 in response to a depressing operation of an operating pedal 16, the pivot lever 20 is pivoted clockwise about the support pin 32 while deforming the tensile coil spring 64 in a tensile manner based on the brake reaction force R, so that the brake reaction force R is transmitted to the sensor rod 46 via the tensile coil spring 64.

The same advantageous effects as those in the above-described embodiment are obtained in the present embodiment as well. Further, if the tensile coil spring 64 is provided in a natural state in an initial state in FIG. 4, the same characteristic as that in FIG. 3(a) is obtained. If the tensile coil spring 64 is provided in a predetermined tensile state, the same characteristic as that in FIG. 3(b) is obtained. In a case where the tensile coil spring 64 is provided in a predetermined tensile state, it is necessary to maintain the tensile coil spring 64 in a tensile state, for example, by providing a stopper for the sensor rod 46.

The embodiments of the invention have been described above in detail with reference to the attached drawings, but each of these embodiments is merely one embodiment, and the invention may be implemented in various modes achieved by making various changes and improvements based on the knowledge of a person skilled in the art.

NOMENCLATURE OF ELEMENTS

8: operating pedal apparatus 10, 60: pedal operation amount detection apparatus 14: support shaft (support axis) 16: operating pedal (transmitting member) 20: pivot lever 22: operating rod (output member) 26: clevis pin (connecting pin) 32: support pin (pivot axis) 34: collar 36: stopper hole (stopper) 44: deformable body 46: sensor rod 47: through-hole 48: compression coil spring (elastic member) 64: tensile coil spring (elastic member) F: pedal operating force R: brake reaction force (reaction force) STs: stopper stroke

The invention claimed is:

1. A pedal operation amount detection apparatus comprising:
    a transmitting member that transmits a pedal operating force;
    a pivot lever provided on the transmitting member so as to be pivotable relative to the transmitting member; and
    a deformable body that is interposed between the transmitting member and the pivot lever, and that deforms based on the pedal operating force,
    the pedal operation amount detection apparatus electrically detecting a pedal operation amount based on a deformation of the deformable body, and
    the deformable body being fixed to the transmitting member,
    the pedal operation amount detection apparatus further comprising:
    a sensor rod fixedly fitted to the deformable body so as to extend upright relative to the deformable body,
    an elastic member provided across the sensor rod and the pivot lever so as to be connected to each other, so that the pedal operating force or a reaction force corresponding to the pedal operating force is transmitted from the pivot lever to the sensor rod via the elastic member, and
    the sensor rod being passed, with a play, through the pivot lever so that the play allows the pivot lever to pivot.

2. The pedal operation amount detection apparatus according to claim 1, wherein:
    the deformable body is an elongate plate deformable in a flexure manner;
    both longitudinal end portions of the elongate plate are fixed to the transmitting member; and the sensor rod is arranged at a longitudinal center portion of the elongate plate so as to extend perpendicularly to the elongate plate.

3. The pedal operation amount detection apparatus according to claim 1, wherein:
the pivot lever has a through-hole; and
the sensor rod is passed, with the play, through the through-hole.

4. The pedal operation amount detection apparatus according to claim 3, wherein the elastic member is a compression coil spring, provided so as to be concentric with the sensor rod, and interposed between the sensor rod and the pivot lever.

5. The pedal operation amount detection apparatus according to claim 3, wherein the elastic member is a tensile coil spring, provided parallel to the sensor rod, provided across the sensor rod and the pivot lever, and hooked on the sensor rod and the pivot lever.

6. A pedal operation amount detection apparatus comprising:
a transmitting member that is provided so as to be pivotable about a support axis, and that transmits a pedal operating force;
a pivot lever provided on the transmitting member so as to be pivotable about a pivot axis that is parallel to the support axis;
an output member to which the pedal operating force is transmitted from the transmitting member via the pivot lever, and which applies a reaction force corresponding to the pedal operating force, to the pivot lever; and
a deformable body that is interposed between the transmitting member and the pivot lever, and that deforms based on the reaction force,
the pedal operation amount detection apparatus electrically detecting a pedal operation amount based on a deformation of the deformable body, and
the deformable body being fixed to the transmitting member,
the pedal operation amount detection apparatus further comprising:
a sensor rod fixedly fitted to the deformable body so as to extend upright relative to the deformable body,
an elastic member provided across the sensor rod and the pivot lever so as to be connected to each other, so that the reaction force is transmitted from the pivot lever to the sensor rod via the elastic member, and
the sensor rod being passed, with a play, through the pivot lever so that the play allows the pivot lever to pivot.

7. The pedal operation amount detection apparatus according to claim 6, having a pedal stroke region including:
an elasticity transmission region in which, in a case where the transmitting member is pivoted about the support axis based on the pedal operating force, the pivot lever pivots relative to the transmitting member while elastically deforming the elastic member based on the reaction force, so that the reaction force is transmitted from the pivot lever to the sensor rod; and
a transmission restricted region in which, when a pivot amount of the transmitting member exceeds a prescribed stopper stroke, the pivot lever comes into contact with a stopper provided in the transmitting member to prevent the pivot lever from further pivoting, so that the reaction force that is transmitted from the pivot lever to the sensor rod is maintained constant.

8. The pedal operation amount detection apparatus according to claim 7, wherein:
the output member is connected to the pivot lever via a connecting pin that is parallel to the pivot axis;
the pivot lever is provided with a collar, and the connecting pin is passed through an inside of the collar;
the transmitting member has a stopper hole which serves as the stopper and through which the collar is passed with a prescribed gap formed around the pivot axis, the gap allows the pivot lever to pivot, and when the pivot amount of the transmitting member reaches the prescribed stopper stroke, the collar comes into contact with an inner wall face of the stopper hole to prevent the pivot lever from further pivoting.

\* \* \* \* \*